United States Patent

Takase

Patent Number: 6,014,276
Date of Patent: Jan. 11, 2000

[54] SERVO MARK DETECTION DEVICE

[75] Inventor: Yasuhiro Takase, Tokyo, Japan

[73] Assignee: NEC Corporation, Tokyo, Japan

[21] Appl. No.: 08/995,939

[22] Filed: Dec. 22, 1997

[30] Foreign Application Priority Data

Dec. 27, 1996 [JP] Japan .................................. 8-350447

[51] Int. Cl.⁷ ...................................................... G11B 5/09
[52] U.S. Cl. .................................................. 360/49; 360/51
[58] Field of Search .............................. 360/49, 51, 77.08

[56] References Cited

FOREIGN PATENT DOCUMENTS 6-44690  2/1994  Japan .

*Primary Examiner*—W. Chris Kim
*Attorney, Agent, or Firm*—Foley & Lardner

[57] ABSTRACT

A servo mark detection device includes a synchronizing circuit, first and second shift registers, a frame pattern detection circuit, a control circuit, and a servo mark comparator. The synchronizing circuit detects a peak of the signal amplitude of a data pattern and outputs a synchronization data signal synchronized with a clock. The first shift register sequentially stores the synchronization data signal and outputs a latch data signal. The detection circuit determines the frame pattern of the latch data signal, outputs a determination data signal, determines a phase shift of the latch data signal with respect to the clock, and outputs a phase correction signal. The control circuit outputs a frame pulse signal at a predetermined clock period, outputs a frame pulse signal at a timing corrected with respect to the predetermined clock period on the basis of the phase correction signal, and outputs a check window signal when a predetermined number of frame pulse signals are output. The second shift register sequentially latches the determination data signal in synchronism with the frame pulse signal, and outputs a servo mark data signal. The comparator compares the servo mark signal with a predetermined reference pattern when the check window signal is active, and outputs a servo mark detection signal.

8 Claims, 8 Drawing Sheets

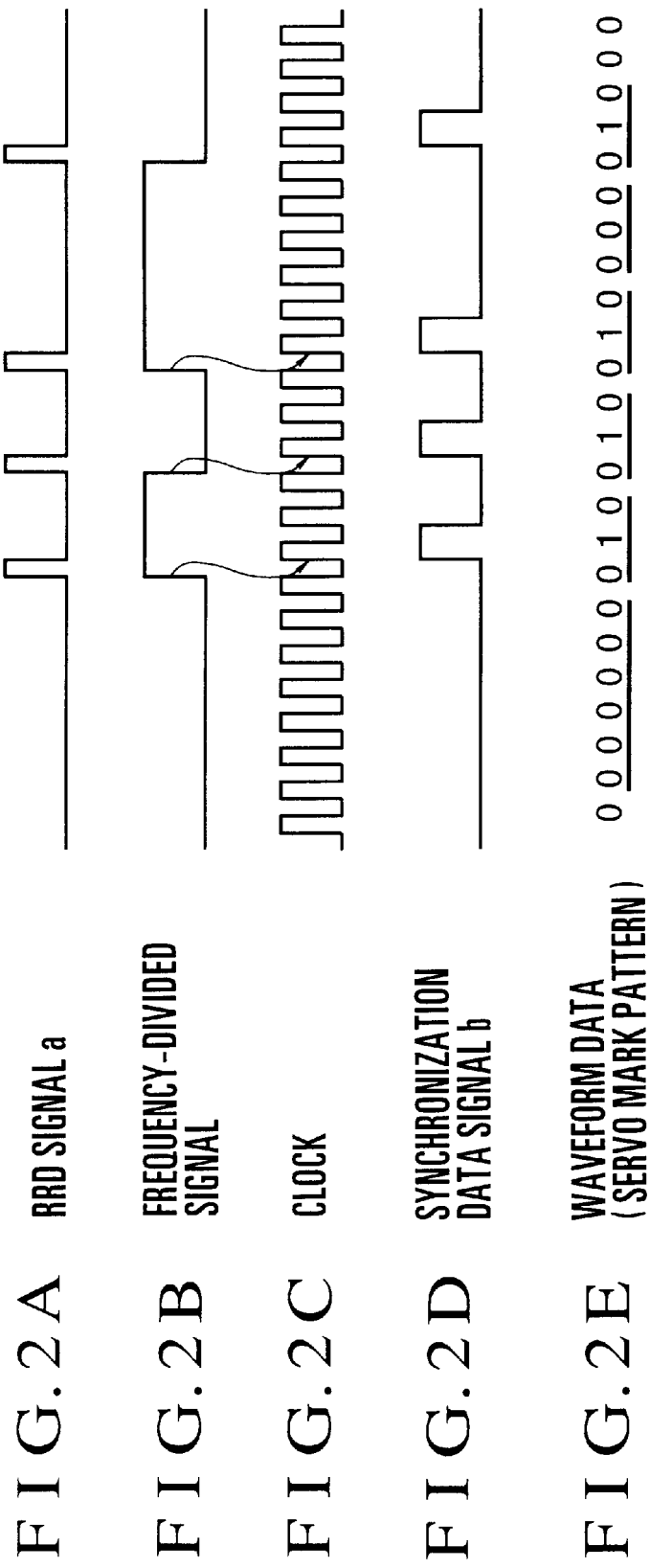

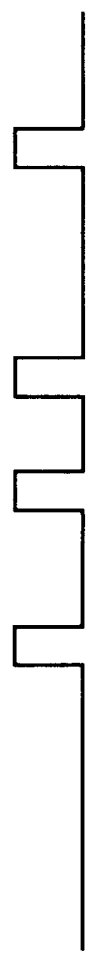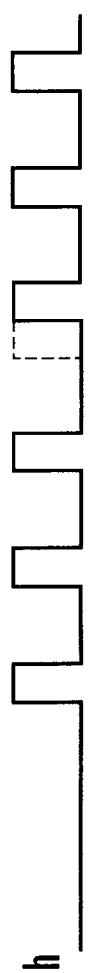
F I G. 5 A   CLOCK
F I G. 5 B   LATCH DATA SIGNAL c
F I G. 5 C   FRAME PULSE SIGNAL h

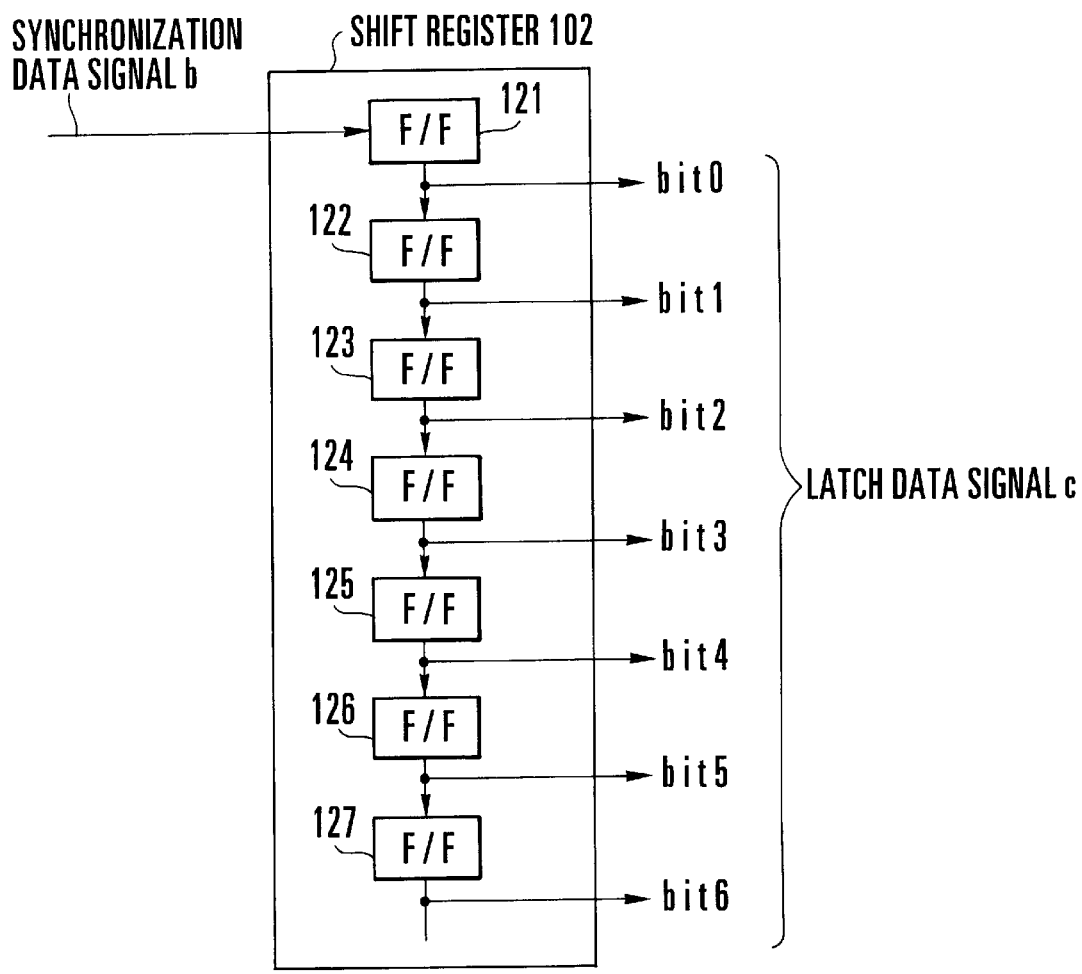
F I G. 6

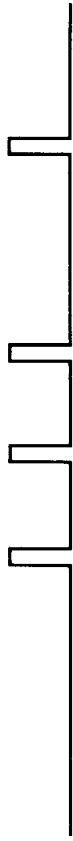
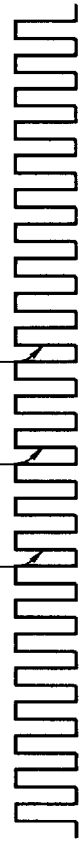
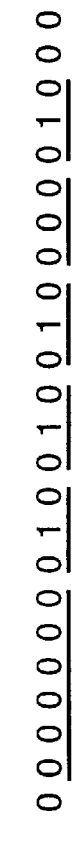
FIG. 10A PRIOR ART — RRD SIGNAL a
FIG. 10B PRIOR ART — FREQUENCY-DIVIDED SIGNAL b
FIG. 10C PRIOR ART — CLOCK
FIG. 10D PRIOR ART — SYNCHRONIZATION DATA SIGNAL b
FIG. 10E PRIOR ART — WAVEFORM DATA (SERVO MARK PATTERN)  0 0 0 0 0 0 0 0 1 0 0 1 0 0 0 0 1 0 0 0

SERVO MARK DETECTION DEVICE

BACKGROUND OF THE INVENTION

The present invention relates to a servo mark detection device for detecting a servo mark pattern in a magnetic disk apparatus of a data surface servo scheme.

In a magnetic disk apparatus of the data surface servo scheme, an area for recording a servo pattern and position information such as a sector address and a cylinder address, which are used to position a magnetic head, is set on the same surface as the data surface of a magnetic disk medium. A data pattern called a servo mark indicating the start position of the position information recording area is recorded on the data surface. As a servo mark detection circuit for detecting this servo mark, an arrangement like the one shown in FIGS. 8 and 9 has been used.

In the apparatus, the above data pattern is read by a head, and the resultant signal is input to a circuit such as a peak detector. The timings of the peaks of the amplitude of the signal are detected by this circuit. As a result, the signal is shaped into a raw read data pulse signal (to be referred to as an RRD signal hereinafter) a.

The conventional servo mark detection circuit includes a synchronizing circuit 1 for receiving this RRD signal a and outputting a synchronization data signal b synchronized with the apparatus clock, a shift register circuit 2 for shifting/storing the synchronization data signal b and outputting an N-bit latch data signal c, and a servo mark comparator 10 for receiving the latch data signal c, checking whether the signal coincides with a pattern corresponding to a predetermined servo mark, and outputting a detection signal m indicating that the servo mark has been detected.

As shown in FIG. 9, the servo mark comparator 10 includes a plurality of comparators 11 to 14 for commonly receiving the latch data signal c and an OR circuit 15 for receiving outputs 101 to 104 from the comparators 11 to 14 and outputting the detection signal m. Although FIG. 9 shows only four comparators 11 to 14 for the sake of descriptive convenience, an actual circuit requires several ten or more comparators.

The operation of the conventional servo mark detection circuit having the above arrangement will be described next with reference to FIGS. 10A to 10E. FIG. 10E shows an example of the servo mark pattern. FIG. 10A shows the RRD signal a corresponding to the servo mark pattern. When this RRD signal a is frequency-divided in the synchronizing circuit 1, the frequency-divided signal shown in FIG. 10B can be obtained. FIG. 10D shows the synchronization data signal b obtained by inputting the signal to the synchronizing circuit 1. The signal b is an output obtained from the synchronizing circuit 1 when the RRD signal a has an ideal waveform without any jitter.

In practice, since the RRD signal a and the apparatus clock shown in FIG. 10C are asynchronous, and fluctuations are caused in both the waveforms owing to variations in rotation in the apparatus, variations in power, and the like, jitter is caused in the synchronization data signal b. For this reason, the synchronization data signal b output from the synchronizing circuit 1 does not always have the waveform shown in FIG. 10D, but may vary forward/backward on the time axis. According to the conventional circuit, therefore, in the servo mark comparator 10 for detecting a servo pattern, forward/backward shifts on the time axis must be allowed within a certain limit, and all possible patterns must be prepared as reference patterns, thereby checking whether a detected pattern coincides with one of the reference patterns.

For this operation, complicated comparators are required, and the operation of each comparator cannot be guaranteed as the clock frequency increases owing to element delays. In addition, to compare a detected pattern with all possible patterns, an enormous number of comparators are required. The apparatus cannot therefore be implemented in practice. For this reason, the number of patterns must be determined by making a compromise. Consequently, a decoding error may occur.

SUMMARY OF THE INVENTION

It is an object of the present invention to provide a servo mark detection device which can operate at a high operating frequency.

It is another object of the present invention to provide a servo mark detection device which can suppress the occurrence of a decoding error without requiring many comparators.

In order to achieve the above objects, according to the present invention, there is provided a servo mark detection device for detecting a data pattern called a servo mark indicating a start position of a specific area on a data surface of a magnetic disk medium of a data surface servo scheme, comprising synchronizing means for detecting a peak of a signal amplitude of a data pattern read by a magnetic head and outputting a synchronization data signal synchronized with a clock from a raw read data signal, first register means for sequentially storing the synchronization data signal from the synchronizing means and outputting an N-bit latch data signal, determination means for determining a frame pattern of the latch data signal from the first register means, outputting a determination data signal indicating the determination result, determining a phase shift of the latch data signal with respect to the clock, and outputting a phase correction signal indicating the determination result, control means for outputting a frame pulse signal at a predetermined clock period, outputting a frame pulse signal at a timing corrected with respect to the predetermined clock period on the basis of the phase correction signal from the determination means, and outputting a check window signal when a predetermined number of frame pulse signals are output, second register means for sequentially latching the determination data signal from the determination means in synchronism with the frame pulse signal from the control means, and outputting a servo mark data signal, and servo mark comparing means for, when the check window signal from the control means is active, comparing the servo mark signal from the second register means with a predetermined reference pattern, and outputting a servo mark detection signal.

BRIEF DESCRIPTION OF THE DRAWINGS

FIGS. 2A to 2E are timing charts showing the process of synchronization of a signal in a synchronizing circuit in FIG. 1;

FIGS. 3A and 3B are views respectively showing a servo mark pattern and a determination data signal;

FIGS. 4A to 4C are timing charts showing the timing of a frame pulse signal in a normal operation;

FIGS. 5A to 5C are timing charts showing the timing of a frame pulse signal when jitter is caused;

FIG. 6 is a circuit diagram showing a shift register for outputting a latch data signal in FIG. 1;

FIGS. 10A to 10E are timing charts showing the process of synchronization of a signal in a synchronizing circuit in FIG. 8.

DESCRIPTION OF THE PREFERRED EMBODIMENT

The present invention will be described in detail below with reference to the accompanying drawings.

Figure 1:
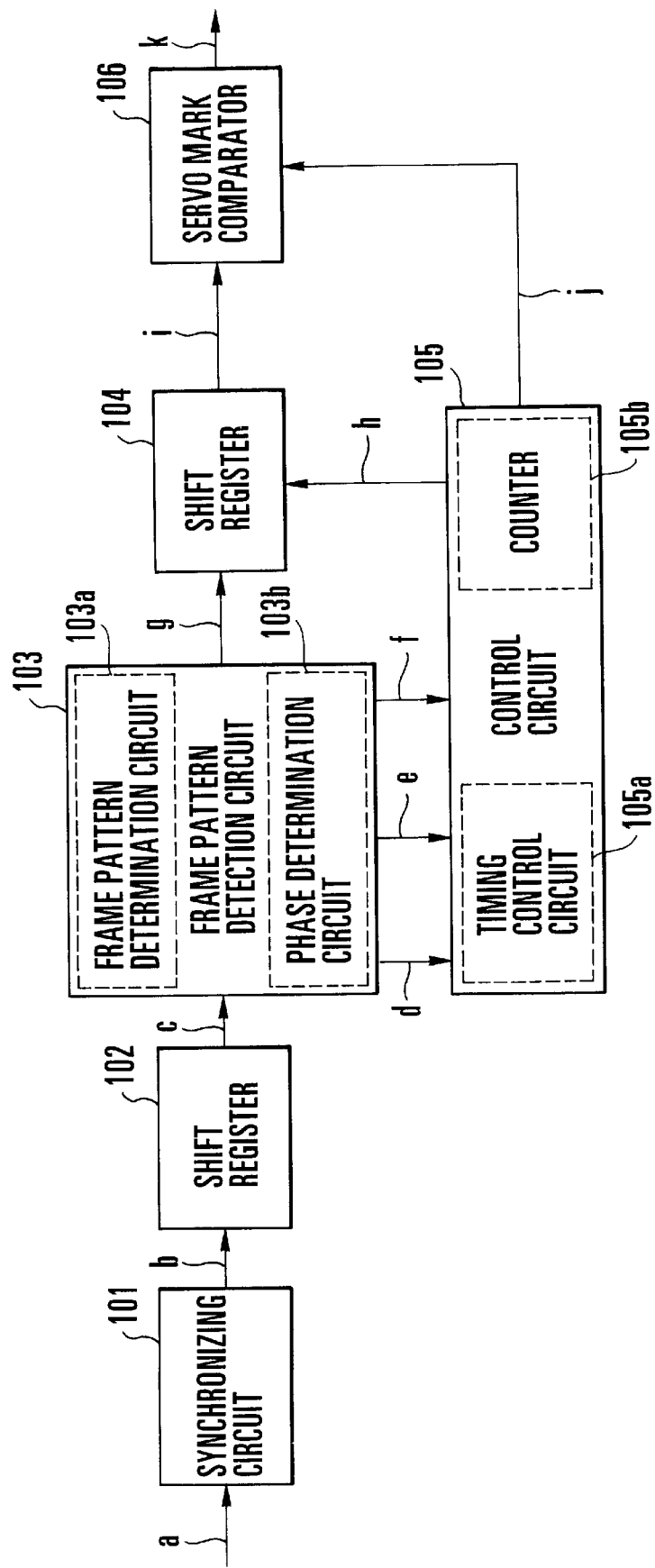
FIG. 1 is a block diagram showing a servo mark detection circuit according to an embodiment of the present invention.

FIG. 1 shows a servo mark detection circuit according to an embodiment of the present invention. The servo mark detection circuit of this embodiment includes a synchronizing circuit 101 for receiving an RRD signal a corresponding to a data pattern indicating a servo mark read from a magnetic disk and outputting a synchronization data signal b synchronized with the apparatus clock, a shift register 102 for shifting/storing the synchronization data signal b and outputting an N-bit latch data signal c, a frame pattern detection circuit 103 for performing various types of determination with respect to the latch data signal c and outputting a DC erase portion detection signal d, a phase lead pulse signal e, a phase lag pulse signal f, and a determination data signal g, a shift register 104 for shifting the determination data signal g in accordance with a frame pulse signal h, storing the resultant signal, and outputting a servo mark data signal i, a servo mark comparator 106 for performing a comparing operation for the servo mark data signal i in accordance with a check window signal j and outputting a detection signal k indicating that a servo mark has been detected, and a control circuit 105 for receiving the DC erase portion detection signal d, the phase lead pulse signal e, and the phase lag pulse signal f from the frame pattern detection circuit 103, outputting the frame pulse signal h to the shift register 104 at a predetermined shift period, and intermittently outputting the check window signal j to the servo mark comparator 106 in a normal operation.

The frame pattern detection circuit 103 includes a frame pattern determination circuit 103a for determining the pattern code of the latch data signal c from the shift register 102 and outputting the determination data signal g to the shift register 104, and a phase determination circuit 103b for determining the relationship between the latch data signal c from the shift register 102 and a phase corresponding to the apparatus clock and outputting the phase lead pulse signal e or the phase lag pulse signal f to the control circuit 105 in accordance with the determination result.

The control circuit 105 includes a timing control circuit 105a for outputting the frame pulse signal h to the shift register 104 at a timing later than a predetermined clock period when the phase lead pulse signal e is output from the frame pattern detection circuit 103, and outputting the frame pulse signal h to the shift register 104 at a timing earlier than the predetermined clock period when the phase lag pulse signal f is output from the frame pattern detection circuit 103, and a counter 105b for counting the number of output frame pulse signals h, and outputting the check window signal j to the servo mark comparator 106 when the count value reaches a predetermined value.

FIG. 6 shows the detailed arrangement of the shift register 102 in FIG. 1. This register is constituted by a plurality of cascaded flip-flops (F/Fs) 121 to 127 for parallelly outputting the latch data signal c consisting of seven bits by sequentially shifting the input synchronization data signal b bit by bit.

The operation of the servo mark detection circuit having the above arrangement will be described with reference to FIGS. 2A to 2E, 3A, and 3B. The RRD signal a is input to the synchronizing circuit 101, in which the signal is frequency-divided to generate a frequency-divided signal in FIG. 2B. This frequency-divided signal is subjected to clocking by the apparatus clock in FIG. 2C to be synchronized therewith, and the resultant signal is output as the synchronization data signal b in FIG. 2D. The synchronization data signal b is input to the shift register 102. The shift register 102 latches the synchronization data signal b to output the shifted latch data signal c. The latch data signal c is input to the frame pattern detection circuit 103. The frame pattern detection circuit 103 outputs the determination data signal g, the DC erase portion detection signal d, the phase lead pulse signal e, and the phase lag pulse signal f on the basis of the latch data signal c.

Assume that a servo mark pattern "000000010010010000010" is recorded on the medium surface, as shown in FIG. 3A. This servo mark pattern is constituted by a DC erase signal "000000" at the head of the pattern and a combination of code 1 "010" and code 0 "000" which follow the DC erase signal. In this case, jitter may be caused by variations in rotational speed and a phase error in the process of synchronization, and the position of "1" may be bit-shifted forward/backward.

As shown in FIG. 3B, therefore, in the frame pattern detection circuit 103, the frame pattern determination circuit 103a detects the pattern "000000" of the latch data signal c as a DC erase portion, and regards a pattern "X000X" ("X" indicating "Don't care"; whether "X" is "0" or "1" is indefinite) as code 0, and a pattern "X010X" as code 1, thereby recognizing a servo mark.

The frame pattern determination circuit 103a outputs "1" as the determination data signal g upon recognizing code 1, and outputs "0" as the determination data signal g upon recognizing code 0. In addition, upon recognizing the pattern "010" after a DC erase portion, the frame pattern determination circuit 103a outputs, to the control circuit 105, the DC erase portion detection signal d indicating that a servo mark can be recorded on an area currently subjected to a read operation.

The pattern "X010X" of the latch data signal c may be recognized as "01XX" or "XX010" depending on the timing of recognition. In this case, upon recognizing the above pattern as "010XX", the phase determination circuit 103b of the frame pattern detection circuit 103 determines a phase lead, and outputs the phase lag pulse signal f to the control circuit 105 to delay the phase of the signal. Upon recognizing the above pattern as "XX010", the phase determination circuit 103b determines a phase lead, and outputs the phase lead pulse signal e to the control circuit 105 to advance the phase of the signal.

When no phase lead or lag occurs upon reception of the DC erase portion detection signal d, the control circuit 105 generates the frame pulse signal h for every three clocks. FIGS. 4A to 4C show the timings of these pulses. FIG. 4A shows the clock. FIG. 4B shows the latch data signal c. FIG. 4C shows the frame pulse signal h.

The shift register 104 receives the determination data signal g at the timing of the frame pulse signal h in FIG. 4C. The determination data signal g input to the shift register 104 repeatedly undergoes an input operation and a shifting operation for each frame pulse signal h to be output as the servo mark data signal i consisting of multiple bits (five bits in this embodiment). At this time, when the phase determination circuit 103b of the frame pattern detection circuit 103 recognizes "010" of the pattern of the latch data signal c as "100" or "001" owing to a bit shift, the circuit 103b determines the occurrence of the bit shift, and outputs the phase lead pulse signal e or the phase lag pulse signal f. Upon reception of the phase lead pulse signal e, the timing control circuit 105a of the control circuit 105 outputs the frame pulse signal h after four clocks from the previous output. Upon reception of the phase lag pulse signal f, the timing control circuit 105a outputs the frame pulse signal h after two clocks.

FIGS. 5A to 5C show a case in which a detected pattern is "001". FIG. 5A shows the clock. FIG. 5B shows the pattern "001" corresponding to the detected pattern. FIG. 5C shows the timing of the frame pulse signal h which has undergone jitter correction in the control circuit 105. The dotted line indicates the timing of the frame pulse signal h when no correction is made. With this operation, an error caused by jitter in the process of synchronization can be corrected.

With this correction, the servo mark comparator 106 for detecting a servo mark compares a reference pattern set in the servo mark comparator 106 with the servo mark data signal i, which is output from the shift register 104 after the determination data signal g output from the frame pattern detection circuit 103 is subjected to jitter correction, and inputting the resultant signal to the shift register 104, instead of the latch data signal c containing an error due to jitter. Therefore, the number of bits to be compared is five although the number of bits of the determination data signal g is 21. In addition, the number of comparison patterns may be one. For this reason, the circuit size can be reduced. The servo mark comparator 106 outputs the detection signal k when the servo mark data signal i coincides with the pattern of the servo mark.

An operation to be performed when jitter is caused will be described in detail next with reference to FIGS. 7A to 7I. As shown in FIG. 7C, the synchronization data signal b synchronized with the clock in FIG. 7B is generated on the basis of an RRD signal $\bar{a}$ in FIG. 7A.

When a servo mark pattern is received, six bits "0"s continue first because the pattern contains the first DC erase portion. For this reason, when the RRD signal $\bar{a}$ is set to "0", six bits "0" s (indicated by n in FIG. 7C) are continuously output. That is, a DC erase portion detection signal $\bar{d}$ is activated and output at the leading edge of the seventh clock after the sixth clock in FIG. 7B (p in FIG. 7D). As shown in FIG. 7H, the frame pulse signal h is output at a timing q upon recognition of the arrival of the pattern "010" after the DC erase portion with the active DC erase portion detection signal $\bar{d}$ serving as a trigger.

If this frame pulse signal h exhibits neither a phase lead nor a phase lag, the control circuit 105 outputs the signal h for every three clocks.

Figure 7:
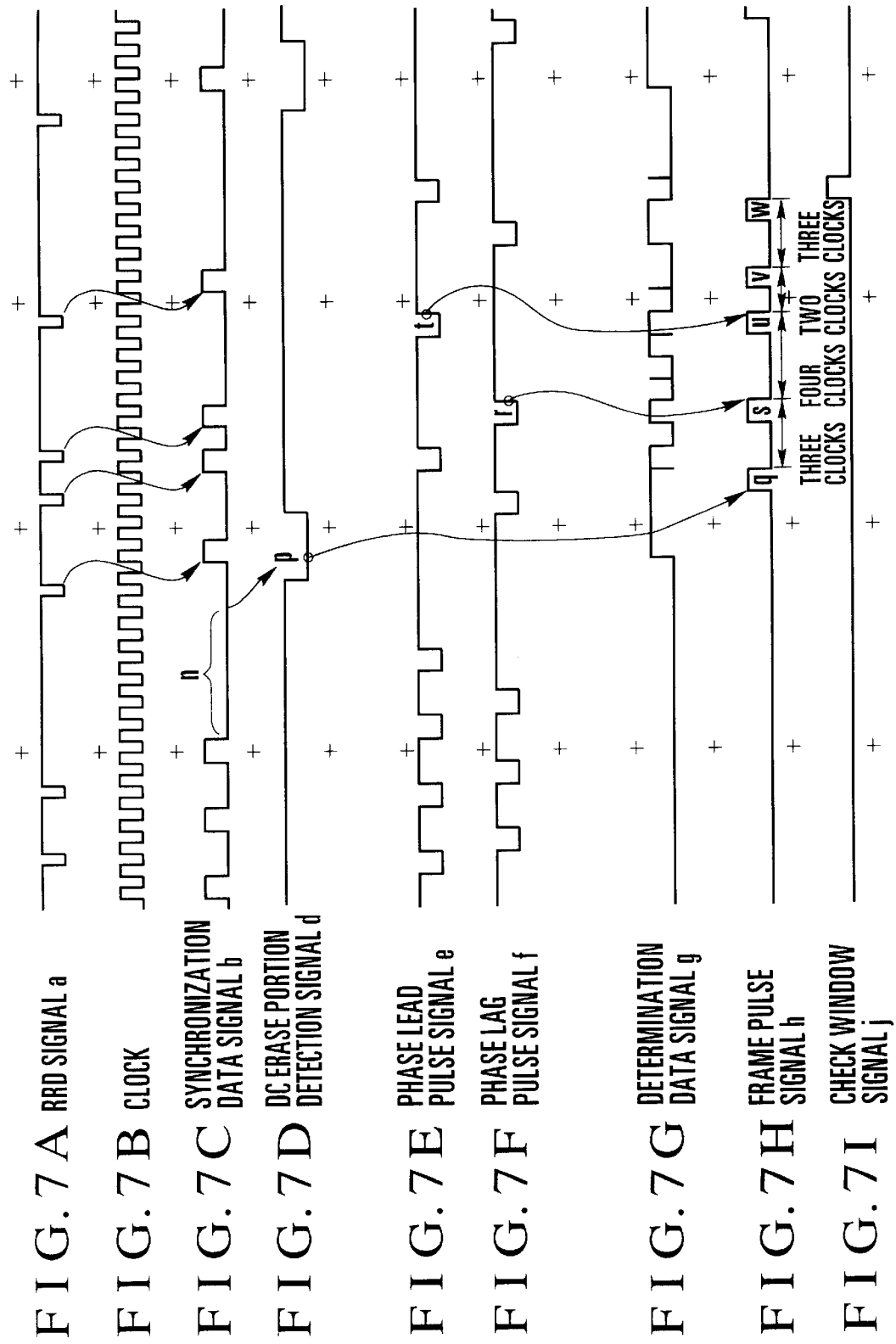
FIGS. 7A to 7I are timing charts of the main part in FIG. 1 when jitter is caused.
Figure 8:
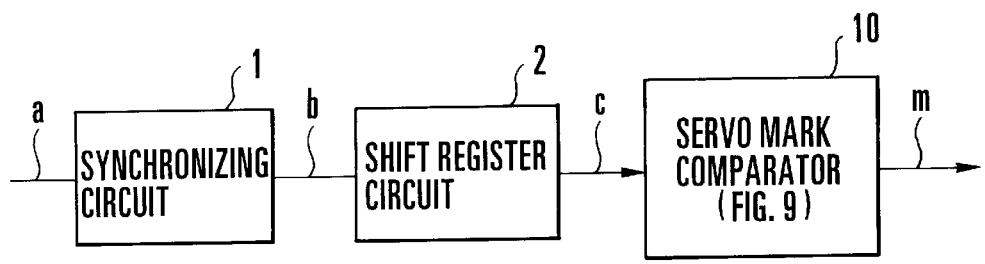
FIG. 8 is a block diagram showing a conventional servo mark detection circuit.
Figure 9:
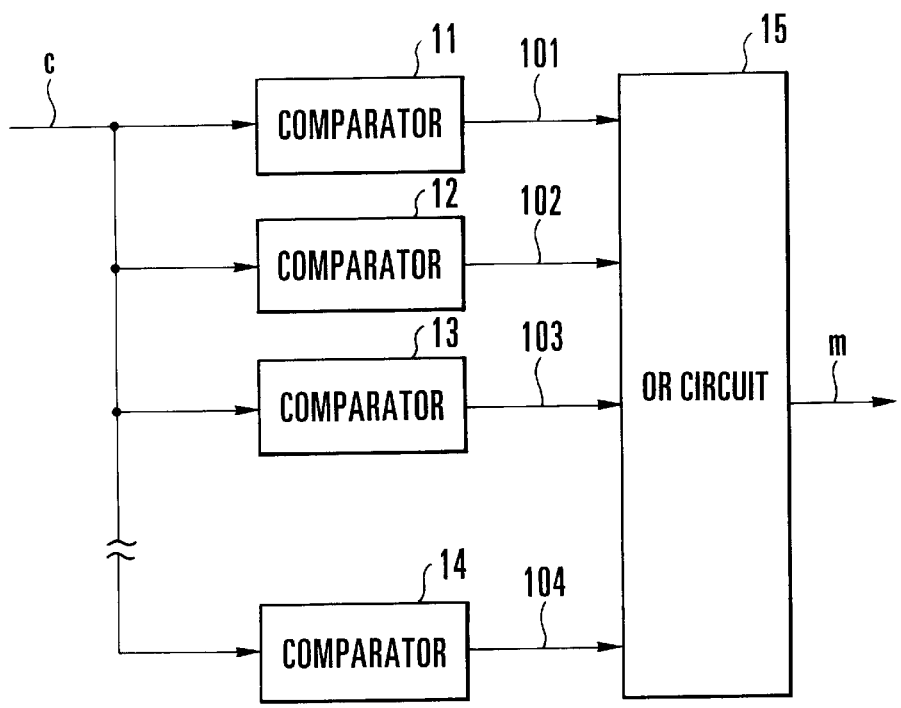
FIG. 9 is a block diagram showing a servo mark detector in FIG. 8.

As shown in FIG. 7H, however, since the phase lag pulse signal f at a timing r in FIG. 7F is active at a timing s of the frame pulse signal h, the frame pulse signal h is activated next at a timing u after four clocks instead of a timing after three clocks.

At the timing u of the frame pulse signal h, the phase lead pulse signal e at a timing t in FIG. 7E is active, as shown in FIG. 7H. For this reason, the frame pulse signal h is activated next at a timing v after two clocks instead of a timing after three clocks.

At the timing v of the frame pulse signal h, neither the phase lag pulse signal f nor the phase lead pulse signal e is active, as shown in FIG. 7H. For this reason, the frame pulse signal h is output next at a timing w after three clocks.

The control circuit 105 outputs the five frame pulse signals h at the timings q, s, u, v, and w to the shift register 104. The shift register 104 shifts and receives the determination data signal g from the frame pattern detection circuit 103 and parallelly outputs the servo mark data signal i every time the frame pulse signal h is input. At the same time, the control circuit 105 outputs the check window signal j to the servo mark comparator 106, as shown in FIG. 7I. Upon reception of the check window signal j, the servo mark comparator 106 compares the servo mark data signal i with the reference pattern stored therein, and outputs the detection signal k when they coincide with each other.

As has been described above, according to the servo mark detection circuit of the present invention, the frame pattern detection circuit 103 outputs the amount of jitter as the phase lead pulse signal e or the phase lag pulse signal f, and the control circuit 105 which receives the signal e or f can correct the jitter by changing the timing of the frame pulse signal h. Since the number of bits of each comparison pattern and the number of types of comparison patterns used in the servo mark comparator 106 can be reduced, the size of each circuit and the number of circuits can be reduced. This arrangement can therefore be applied to a high-speed circuit which operates at a high operating frequency. Since recording frequencies tend to increase more and more with an increase in recording density, this increase in operating speed provides great effects.

What is claimed is:

1. A servo mark detection device for detecting a data pattern called a servo mark indicating a start position of a specific area on a data surface of a magnetic disk medium of a data surface servo scheme, comprising:

synchronizing means for detecting a peak of a signal amplitude of a data pattern read by a magnetic head and outputting a synchronization data signal synchronized with a clock from a raw read data signal;

first register means for sequentially storing the synchronization data signal from said synchronizing means and outputting an N-bit latch data signal;

determination means for determining a frame pattern of the latch data signal from said first register means, outputting a determination data signal indicating the determination result, determining a phase shift of the latch data signal with respect to the clock, and outputting a phase correction signal indicating the determination result;

control means for outputting a frame pulse signal at a predetermined clock period, outputting a frame pulse signal at a timing corrected with respect to the predetermined clock period on the basis of the phase correction signal from said determination means, and outputting a check window signal when a predetermined number of frame pulse signals are output;

second register means for sequentially latching the determination data signal from said determination means in synchronism with the frame pulse signal from said control means, and outputting a servo mark data signal; and servo mark comparing means for, when the check window signal from said control means is active, comparing the servo mark signal from said second register means with a predetermined reference pattern, and outputting a servo mark detection signal.

2. A device according to claim 1, wherein said determination means comprises frame pattern determination means for determining whether a pattern code of the latch data signal from said first register means is "0" or "1", and outputting a determination data signal, and phase determination means for determining whether a latch data signal from said first register means exhibits a phase lead or lag with respect to the clock, and outputting a phase correction signal.

3. A device according to claim 2, wherein said frame pattern determination means determines "0" as the pattern code when the frame pattern of the latch data signal from said first register means is "X000X" (X is an arbitrary value), and determines "1" as the pattern code when the frame pattern of the latch data signal from said first register means is "X010X".

4. A device according to claim 3, wherein said frame pattern determination means outputs a DC erase portion detection signal to said control means upon detecting a DC erase portion in which a predetermined number of "0"-bit signals continue, and said control means outputs a frame pulse signal at a predetermined clock period upon reception of the DC erase portion detection signal from said frame pattern determination means.

5. A device according to claim 2, wherein said phase determination means outputs a phase lag pulse signal for delaying a phase upon recognizing that the frame pattern of the latch data signal from said first register means is "010XX" (X is an arbitrary value), and outputs a phase lead pulse signal for advancing the phase upon recognizing that the frame pattern of the latch data signal from said first register means "XX010", and the phase correction signal is constituted by the phase lag pulse signal and the phase lead pulse signal.

6. A device according to claim 1, wherein said control means comprises timing control means for outputting a frame pulse signal at a timing later than the predetermined clock period when the phase correction signal from said determination means indicates a phase lead, and outputting a frame pulse signal at a timing earlier than the predetermined clock period when the phase correction signal indicates a phase lag, and count means for counting the number of output frame pulses and outputting a check window signal when the count value reaches a predetermined value.

7. A device according to claim 6, wherein said timing control means outputs a frame pulse signal three clocks after an immediately preceding frame pulse signal when no phase correction signal is output from said determination means, outputs a frame pulse signal four clocks after an immediately preceding frame pulse signal when a phase correction signal indicating a phase lead is output from said determination means, and outputs a frame pulse signal two clocks after an immediately preceding frame pulse signal when a phase correction signal indicating a phase lag is output from said determination means.

8. A device according to claim 1, wherein the specific area is an area on which at least one of servo pattern and position information used to position the magnetic head is recorded.

* * * * *